Sept. 22, 1970 D. G. DREWRY ET AL 3,529,619

VALVE DEVICE

Filed July 9, 1969

DAVID G. DREWRY
RALPH M. NEWMAN, JR.
INVENTORS

BY William F. Smith

AGENT

United States Patent Office 3,529,619
Patented Sept. 22, 1970

3,529,619
VALVE DEVICE
David G. Drewry, Cumberland, Md., and Ralph M. Newman, Jr., Wilmington, Del., assignors to Hercules Incorporated, Wilmington, Del., a corporation of Delaware
Continuation-in-part of application Ser. No. 468,675, June 28, 1965. This application July 9, 1969, Ser. No. 840,197
Int. Cl. F16k 1/12, 27/00
U.S. Cl. 137—219                                         6 Claims

ABSTRACT OF THE DISCLOSURE

This invention relates to a valve device for high temperature fluids having in combination an outer casing having a fluid passageway extending therethrough, an inner casing having opposed streamlined struts supporting and spacing said inner casing within the outer casing, a slidable valve member disposed within the inner casing having its valve head protruding from the egress end thereof, a valve seat for the valve head supported within the outer casing at its egress end in axial alignment with said valve head, and an hydraulic cylinder completely housed within the slidable valve member to axially move the slidable valve member in each direction relative to the valve seat to control the flow of high temperature fluid through the valve device.

---

This application is a continuation-in-part of our copending application Ser. No. 468,675 filed June 28, 1965.

This invention relates to valves and more particularly to a valve device for high temperature fluids which is capable of controlling the flow of extremely hot propellant gases such as rocket propellant gas, and the like.

In the past, it has been the general practice to construct pneumatic gas valves of steel or other metals which, in addition to being inordinately heavy, have not been able to survive temperatures above about 3000° F. Consequently, the ability to control gas flow in a variety of devices such as rocket vehicles, missiles, jet assist take-off units, and other devices requiring hot gas control has been severely limited.

Accordingly, it is a principal object of the present invention to provide a high temperature valve device which is fabricated from light weight materials and which is capable of withstanding extremely high temperatures for required periods of utility. For example, lightweight valve devices in accordance with this invention have withstood gas temperatures in the order of 6500° F.

Another object of the present invention is to provide a gas valve device capable of controlling the flow of hot propellant gas for thrust vector centrol and thrust control of a propulsion vehicle such as by direct egress means or by indirect agress means such as injection of gas into the propelling stream to thereby effect vectoring.

Other objects of the invention will appear hereinafter, the novel features and combinations being set forth in the appended claims.

Generally described, the present invention contemplates a valve device for high temperature fluids having in combination a metallic outer casing lined from its ingress end to its egress end with nonmetallic insulating material and having a fluid passageway extending therethrough; a nonmetallic inner casing of insulating material having opposed streamlined struts supporting and equally spacing said inner casing within the outer casing; a metallic cross bar secured to the metallic outer casing and extending through the inner casing and the streamlined struts; a nonmetallic slidable valve member of insulating material disposed within the inner casing having its valve head protruding from the egress end thereof; a valve seat for the valve head supported within the outer casing at its egress end in axial alignment with said valve head; an hydraulic cylinder housed and secured within the slidable valve member and having its piston rod secured to the metallic cross bar, and passages extending through the metallic cross bar in communication with the hydraulic cylinder for controlled passage of hydraulic fluid therethrough whereby the slidable valve member is moved in each direction relative to the valve seat by the hydraulic cylinder to control the flow of high temperature fluid through the valve device.

Preferred embodiments of the invention have been chosen for purposes of illustration and description and are shown in the accompanying drawing forming a part of the specification wherein reference symbols refer to like parts wherever they occur and wherein.

Figure 2:
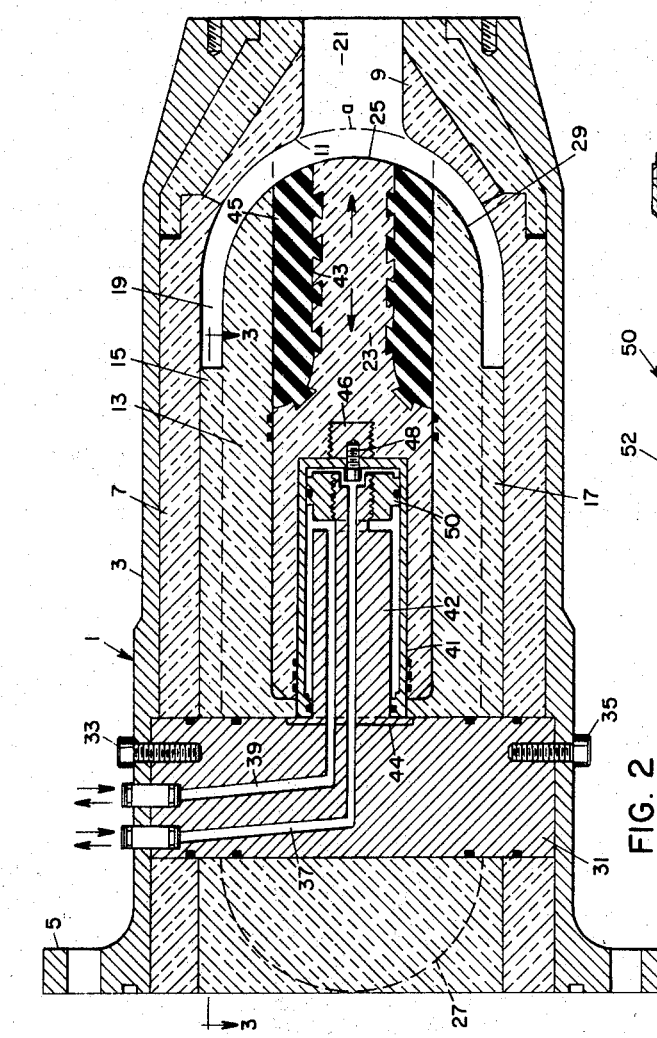
FIG. 2 is a sectional view of the valve device taken along line 2—2 of FIG. 1.
Figure 1:
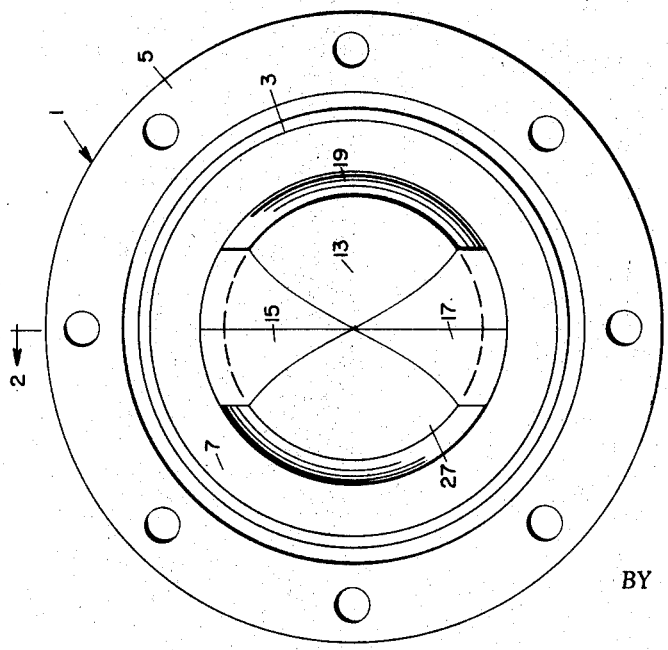
FIG. 1 is an elevational view showing the ingress end of a valve device in accordance with one embodiment of the invention aspecially adapted for on-off control of fluid passing therethrough.

Referring now to FIG. 1 and FIG. 2, there is depicted a valve device 1 which has a rigid metallic outer casing 3 constructed of aluminum alloy and provided with a flange 5 for connection to a suitable source (not shown) of hot fluid medium. The outer casing 3 is lined from its ingress end to its egress end, where it is necked down, with a liner 7 of asbestos phenolic insulating material. The necked down portion of the outer casing 3 is further lined with a graphite liner 9, having a reduced diameter, the face of which forms a valve seat 11.

Figure 3:
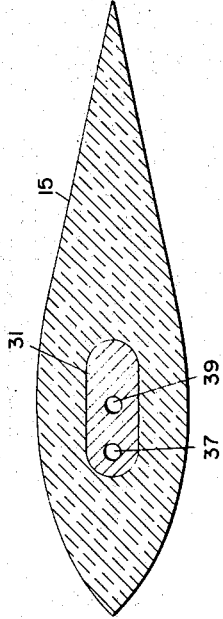
FIG. 3 is a sectional view of the valve device taken along line 3—3 of FIG. 2.

An inner casing 13 of asbestos phenolic insulating material is supported and spaced within the outer casing 3 and its liner 7 by an upper and a lower streamlined strut 15 and 17, respectively. The configuration of the streamlined struts is of the air-foil type, particularly depicted in FIG. 3. The spacing of the inner casing 13 within the outer casing 3 and its liner 7 provides a passageway 19 therebetween which is extended throughout the valve device 1 including the necked down portion, thus forming an orifice 21 at its egress end.

A cylindrical slidable valve member 23 of composite structure, hereinafter described, is disposed within the inner casing 13 and has a valve head 25 in external alignment therewith when the valve member 23 is fully retracted. The valve head 25 is disposed in axial alignment with the valve seat 11. The inner casing 13 is cylindrical and has partly hemispherical ends 27 and 29, respectively, at its ingress and egress ends due to intersection of the struts 15 and 17 at the ingress end and interruption of the valve head 25 at the egress end.

A rectangular cross bar 31 of stainless steel is secured to the outer casing 3 by bolts 33 and 35 and extends through the liner 7, the inner casing 13 and the struts 15 and 17. The cross bar 31 has a passage 37 and a passage 39 therein which extends into communication with an hydraulic cylinder 41 which is housed within the slidable valve member 23 and which has its piston rod 42 terminating in a flange 44 which is secured to the cross bar 31 as by welding thereto. The flange 44 serves as an aft stop for the hydraulic cylinder 41 as the body thereof travels to and fro on its piston rod 42. A threaded metallic plug 46 is threadedly secured in the slidable valve member 23 and a bolt 48 extending through the end of the hydraulic cylinder 41 as threadedly secured in the plug 46 to thereby insure a rigid and sturdy connection of the hydraulic cylinder 41 within the slidable valve member 23.

In operation, a conventional hydraulic servo-valve (not shown) provides controlled passage of hydraulic fluid into and from the hydraulic cylinder 41. When pressurized hydraulic fluid is passed through extended passage 37 to the forward side of piston 50 which is rigidly secured to piston rod 42, the slidable valve member 23 is forced forward. Conversely, when pressurized hydraulic fluid is passed through extended passage 39 to the rearward side of piston 50, the slidable valve member 23 is forced rearward.

The slidable valve members 23 of composite structure has its main body portion made of asbestos phenolic insulating material and has a plurality of undercut peripheral grooves represented by 43 formed therein at its forward body portion. A sleeve 45 of asbestos Buna "S" rubber is formed over the grooved body portion and locked thereto by the undercut grooves. In actuating the slidable valve member 23, it is the forward end of the sleeve 45 as a part of the valve head 25 which comes into direct contact with the annular graphite valve seat 11 to effect the fully "off" control as shown by the forward posiiton at *a*. Suitable seals, such as O ring seals, are provided between the inner casing 13 and the valve member 23 to form an effective seal therebetween and yet permit reciprocating actuation of the valve member.

Figure 4:
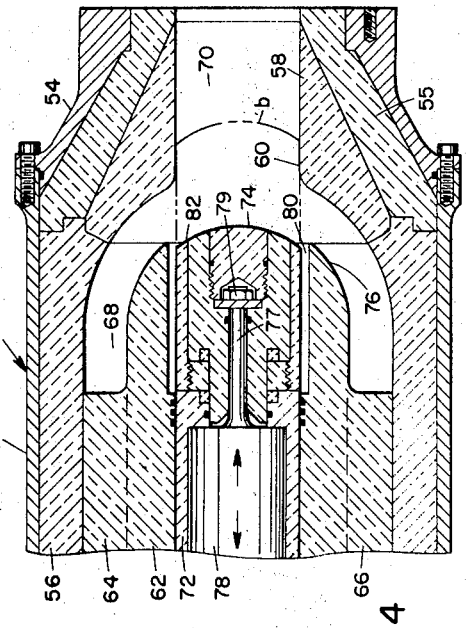
FIG. 4 is a fragmentary sectional view of a valve device in accordance with another embodiment of the invention especially adapted for modulating control of fluid passing therethrough.

Referring now particularly to FIG. 4, another embodiment of the present invention is depicted. This embodiment shows a valve device 50 in fragmentary section since the ingress end, the outer casing with liner, the inner casing, the streamlined struts, cross bar and the hydraulic cylinder and its operation are similar to that of the valve device 1. The valve device 50, however, is especially designed to afford modulating control of the high temperature fluid passing therethrough. In this embodiment, the valve device 50 has a rigid outer casing 52 having a necked down casing 54 a affixed thereto, both casings being constructed of aluminum alloy. The outer casing 52 is lined to its egress end, where it is necked down, with a liner 56 of asbestos phenolic insulating material. The necked down casing 54 is further lined with asbestos phenolic insulating material 55 and with a graphite liner 58 having a reduced diameter, the interior of which forms a sleeve valve seat 60.

An inner casing 62 of asbestos phenolic insulating material is supported and spaced within the outer casing 52 and its liner 56 by an upper and a lower streamlined strut 64 and 66, respectively. The configuration of the streamlined struts is similar to that depicted in FIG. 3. The spacing of the inner casing 62 with in the outer casing 52 and its liner 56 provides a passageway 68 therebetween which is extended throughout the valve device 50 including the necked down portion, thus forming an orifice 70 at its egress end.

A sylindrical slidable valve member 72 of composite structure, hereinafter described, is disposed within the inner casing 62 and has a valve head 74 in external alignment with the partly hemispherical end 76 of the inner casing 62 when the valve member 72 is fully retracted. The valve head 74 is in axial alignment with the sleeve valve seat 60 and is compatible therewith so as to slide thereinto when fully extended to the fully "off" position shown at *b* by hydraulic cylinder 78 which is completely housed in the slidable valve member 72. The hydraulic cylinder 78, its associated parts and positioning features are similar to those of the first described embodiment, with the exception that a tie rod 77 is secured to the end of cylinder 78 and extends into the valve member 72 and is secured therein by a nut 79 which has a threaded plug of insulating material placed thereover which is contoured to the valve head 74.

In the embodiment depicted in FIG. 4, the slidable valve member 72 of composite structure has its main body portion made of asbestos phenolic insulating material which is suitably affixed in association with the hydraulic cylinder 78 as previously described. The rearward portion of the valve member 72 is in slidable relationship with the inner casing 62, and suitable seals, such as O ring seals previously mentioned, are positioned to form an effective seal therebetween. The forward portion of the valve member 72, however, is not in slidable relationship with the inner casing 62 since the forward portion of the latter has an increased diameter which forms an annular space 80 therebetween.

A sleeve 82 of graphite is threadedly secured at its rear end into and affixed over the valve member 72 which is of reduced diameter in this forward portion so that the annular space 80 is maintained. This permits facile movement of the valve member 72 by the hydraulic cylinder 78 so that the valve head 74 as it is moved to and fro relative to the sleeve valve seat 60, imparts a modulating effect including complete cut-off as desirably controlled. In approaching and attaining complete "off" control, it is the sleeve 82 of graphite on the forward portion of the valve member 72 which slidably engages the sleeve valve seat 60 of the graphite liner 58.

With reference to the foregoing, it is evident that there are numerous factors which will influence the selection of satisfactory materials of construction for the present invention, the actual requirements of which will be determined by the particular liquids or gases to be handled. The materials set forth in the foregoing description and their positioning represent preferred embodiments for controlling the flow of extremely hot propellant gas such as rocket motor propellant gas. However, regardless of the liquid or gas source involved, it will be found that this invention is of special utility in connection with the flow control of many extremely hot fluids in whatever positioning or interpositioning of the device is desired. Moreover, it will be found that the principal advantages of the invention reside in the attainment of its objectives but that additional advantages accure when the invention is used under any conditions of severe heat environment where thermal, mechanical and erosive stability of a valve device is required. Furthermore, it will be found that the invention is particularly adaptable to the handling of high velocity fluids used for vectoring since streamlining of the entrance, internal and external elements of the device permits the passage of such fluids therethrough whereby a subsonic effect is created in the ingress end and body portion of the device and a sonic effect is created at its egress end.

It will be appreciated, therefore, that this invention may be carried out by the use of various modifications and changes without departing from its spirit and scope.

What we claim and desire to protect by Letters Patent is:

1. A valve device for high temperature fluids having in combination
   (a) a metallic outer casing lined from its ingress end to its egress end with nonmetallic insulating material and having a fluid passageway extending therethrough,
   (b) a nonmetallic inner casing of insulating material having opposed streamlined struts supporting and equally spacing said inner casing within the outer casing,
   (c) a metallic cross bar secured to the metallic outer casing and extending through the inner casing and the streamlined struts;
   (d) a nonmetallic slidable valve member of insulating material disposed within the inner casing having its valve head protruding from the egress end thereof,
   (e) a valve seat for the valve head supported within the outer casing at its egress end in axial alignment with said valve head, (f) an hydraulic cylinder housed and secured within the slidable valve member and having its piston rod secured to the metallic cross bar, and (g) passages extending through the metallic cross bar in communication with the hydraulic cylinder for controlled passage of hydraulic fluid therethrough whereby the slidable valve member is moved in each direction relative to the valve seat by the hydraulic cylinder to control the flow of high temperature fluid through the valve device.

2. The valve device according to claim 1 wherein
(a) the valve seat for the valve head has a reduced diameter relative to the valve head to enable the head to positively engage the seat to effect complete cut-off of high temperature fluids passing through the device.

3. The valve device according to claim 1 wherein
(a) the valve seat for the valve head has a diameter compatible with the valve head to enable the head to slidably engage the seat to effect a modulating control of high temperature fluids passing through the device including complete cut-off.

4. The valve device according to claim 1 wherein
(a) the outer casing has the passageway at its ingress end of greater diameter than its egress end, and
(b) the inner casing has its ingress end and its egress end partly hemispherical whereby a subsonic effect is created in the body portion of the device and a sonic effect is created at the egress end of the device.

5. The valve device according to claim 1 wherein
(a) the valve head has a convex surface and the overall configuration of the inner casing and valve head in retracted position at the egress end of the inner casing is substantially hemispherical and equally spaced from the outer casing.

6. The valve device according to claim 1 wherein
(a) the valve head has a convex surface and the overall configuration of the inner casing and valve head in retracted position at the egress end of the inner casing is substantially hemispherical and equally spaced from the outer casing, and
(b) the overall configuration of the inner casing at its ingress end is substantially hemispherical.

References Cited

UNITED STATES PATENTS

| | | | |
|---|---|---|---|
| 1,919,165 | 7/1933 | Kinzie | 137—221 |
| 2,364,907 | 12/1944 | Mattimore | 137—219 |
| 2,835,107 | 5/1958 | Ward | 60—271 |
| 2,976,880 | 3/1961 | Cassarino et al. | 251—63 X |
| 3,102,550 | 9/1963 | Shand et al. | 137—219 |

M. CARY NELSON, Primary Examiner

M. O. STURM, Assistant Examiner

U.S. Cl. X.R.

137—375